March 16, 1954 — M. E. NYE — 2,671,933
METHOD OF MOLDING RUBBER WHEELS
Filed Aug. 5, 1952

INVENTOR.
MAURICE E. NYE, DECEASED BY
WILLARD L. NYE, EXECUTOR
BY
Wooding and Krost,
attys.

Patented Mar. 16, 1954

2,671,933

UNITED STATES PATENT OFFICE 2,671,933

METHOD OF MOLDING RUBBER WHEELS

Maurice E. Nye, deceased, late of Barberton, Ohio, by Willard L. Nye, executor, Barberton, Ohio Application August 5, 1952, Serial No. 302,766

2 Claims. (Cl. 18—55)

This invention relates to rubber molding in general, and relates more particularly to the method of readily removing individually molded articles from the mold cavity.

This invention is an improvement over United States Letters Patent No. 2,072,349, issued to Herbert N. Wayne, dated March 2, 1937, and a continuation-in-part application of patent application Serial No. 47,287, filed September 1, 1948, patent application Serial No. 47,287, has been abandoned.

The Wayne patent teaches the use of a two-part mold and the injection through a plurality of feeding gates of vulcanizable rubber into the mold cavity from a single sheet of unvulcanized rubber joining the several feeding gates. Thus, when the two-part mold is broken open, the molded article is held into the mold cavity portion through which the feeding gates extend by reason of the connection of the rubber within the feeding gates to the molded article. Thereafter, Wayne teaches the stripping of the sheet of rubber and the material in the feed gates off in a single sheet, thereby releasing the molded article for ready removal from the mold cavity.

The object of this invention is to provide means for rapidly ejecting a plurality of such molded articles from a mold plate after the molded pieces have been released from the supply sheet by stripping of the sheet and the material in the feeding gates off of the mold.

Other objects and a fuller understanding of the invention may be had by referring to the following description and claims, taken in conjunction with the accompanying drawings, in which:

Figure 1:
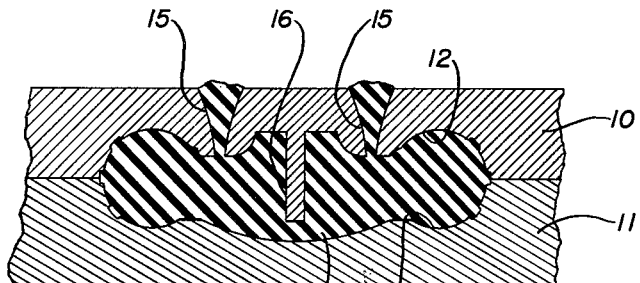
Figure 1 is a sectional view through a single cavity of a two-part mold.

A first mold plate 10 and a second mold plate 11 having mold cavities 12 and 13 respectively therein are joined in the usual manner to define a mold chamber 14.

Although not in common practice, feed gates are well known by those skilled in the rubber molding art. Such feed gates are indicated by the reference character 15 in the drawing. The rubber may be fed into the chamber 14 through the gates 15 by an injection molding apparatus, or from a single sheet of stock as taught in the Wayne patent referred to above. In either event, after the chamber 14 has been injected full of vulcanizable rubber compound and the compound subjected to sufficient pressure to cause the rubber to vulcanize into a usable form, the excess material residing within the feed gates 15 may be stripped out of the feed gates 15 to release the molded article. The feed gates 15 are made in tapered form with a small entry into the mold chamber 14 in order to produce the weakest point between the material in the feed gates 15 and the molded article in the chamber 14 directly at the entry of the gates into the chamber.

In the Wayne patent it is taught that the material in the feeding gates 15 should be allowed to remain in the gates 15 until after the bottom mold plate 11 has been separated from the upper mold plate 10. Thus, if all other factors are equal causing adhesion between the molded article in the chamber 14 and the mold cavities 12 and 13, the molded article will stay in the mold cavity 12 because of the larger holding power created by the union of the vulcanized rubber material in the gates 15 with the molded article. In the particular mold shown, which is for a toy automobile wheel, a pin 16 is provided in the upper mold plate 10 to extend into the chamber 14 and define an axial opening which may be employed to hold the wheel upon an axle of a toy automobile. Thus, the axial pin 16 also aids in holding the molded wheel in the mold chamber 12.

Figure 2:
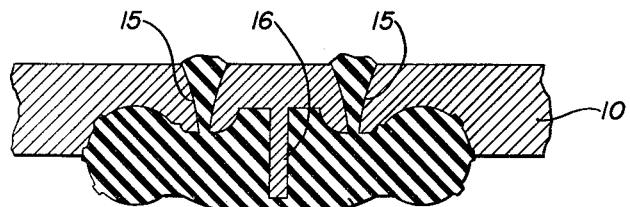
Figure 2 is a view similar to Figure 1 with the bottom mold plate stripped away.
Figure 3:
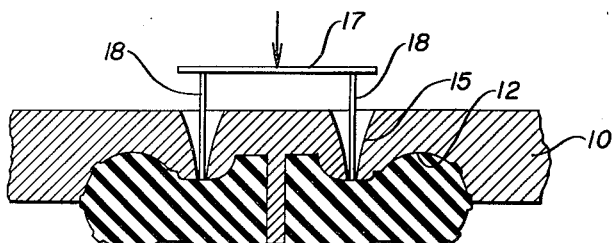
Figure 3 is a diagrammatic illustration of the ejection of the molded piece from the upper mold plate after the feeding gates have been emptied.

After the molding operation has ceased and the bottom mold plate 11 stripped away as illustrated in Figure 2 of the drawings, then the excess rubber in the gates 15 is removed by stripping away the excess pad as taught by the Wayne patent, or by removing the injection heads when injection molding is employed. In either event the molded article will remain loosely bonded in the mold cavity 12 as illustrated in Figure 3 of the drawings.

Although it is perfectly possible to pick each of the molded articles out of the mold cavity 12, according to this invention there is provided a frame member 17 having a plurality of pins 18 corresponding to each of the feeding gates 15 of the upper mold plate 10. Pressure upon the frame member 17 is thereafter applied and the pins 18 are driven through the gates 15 and contact solid rubber, thereby forcing the finished wheel off of the pin 16 and out of the cavity 12.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. The method of molding and removing a rubber article of manufacture from a mold, comprising providing a first mold section having a mold cavity therein, a second mold section having a mold cavity therein, said first and second sections being adapted to be mated with said cavities defining a molding chamber, providing a mold pin extending from said first mold section into said chamber, providing feeding gates entering said chamber at a spaced distance from said pin, injecting uncured vulcanizable rubber compound into said chamber through said feeding gates, curing the rubber in said chamber and feeding gates, thereafter removing the rubber from said feeding gates, thereafter separating said second mold section from said first mold section, and finally forcing pin means through said feeding gates to contact the molded rubber article and force it off said pin and out of said cavity in the first mold section.

2. The method of molding and removing a rubber article of manufacture from a mold, comprising providing a first mold section having a mold cavity therein, a second mold section having a mold cavity therein, said first and second sections being adapted to be mated with said cavities defining a molding chamber, providing feeding gates entering said chamber, injecting uncured vulcanizable rubber compound into said chamber through said feeding gates, curing the rubber in said chamber and feeding gates, thereafter removing the rubber from said feeding gates, and separating said second mold section from said first mold section, and finally forcing pin means through said feeding gates to contact the molded rubber article and force it out of said cavity in the first mold section.

WILLARD L. NYE,
*Executor of the estate of Maurice E. Nye, deceased.*

References Cited in the file of this patent
UNITED STATES PATENTS

| Number | Name | Date |
|---|---|---|
| 2,072,349 | Wayne | Mar. 2, 1937 |
| 2,579,952 | Morin | Dec. 25, 1951 |